Nov. 14, 1967    TAKASHI KURODA    3,352,290
MULTI-STAGE ROTARY PISTON ENGINE
Filed July 27, 1965    2 Sheets-Sheet 1

Takashi Kuroda
INVENTOR.

BY
Wenderoth, Lind & Ponack
Attorneys

United States Patent Office 3,352,290
Patented Nov. 14, 1967

3,352,290
MULTI-STAGE ROTARY PISTON ENGINE
Takashi Kuroda, Hiroshima-shi, Japan, assignor to Toyo Kogyo Company Limited, Hiroshima-ken, Japan
Filed July 27, 1965, Ser. No. 475,199
Claims priority, application Japan, Aug. 13, 1964, 39/46,676
5 Claims. (Cl. 123—8)

ABSTRACT OF THE DISCLOSURE

A crankshaft for a rotary internal combustion engine, the crankshaft being composed of a plurality of aligned, joined sections having axial center oil bores and being joined by means of a crown gear toothed coupling on each end of the sections. Each coupling portion has a radially inwardly facing annular groove extending radially outwardly from the center oil bore and an annular seal engaged in the said annular grooves for sealing the said coupling to prevent the lubrication oil leakage through the toothed coupling.

---

The present invention relates to a multi-stage rotary piston internal combustion engine and more particularly to a lubrication means for that type of engine composed of several engine units assembled in tandem.

In framing a multi-stage rotary piston internal combustion engine which is in a form of an assemblage of several rotary piston engine units in tandem so that the output of the crankshaft is the sum of the outputs of the individual rotary pistons, it is suggested to employ crankshafts made in sections corresponding to the individual stage of the engine and connect them in tandem by a crown gear means on the end of the shaft sections. This crankshaft arrangement is recommended because the arrangement eliminates complicated interconnections between each section of the shaft and the engine can be assembled in compact without vacant space between each individual engine unit. Another advantage of the said arrangement is that section walls defining each combustion chamber for each engine unit and forming main bearings can be made in one piece though a bearing bore of the walls is smaller in diameter than that of crank-pins on the crankshafts. Thereby the structure of the housing is considerably simplified. Furthermore according to the said crankshaft arrangement it is easy to secure the various pistons at a correct angle phase to obtain correctly spaced power impulses.

The problem of the above described engine is that the framing involves multiple main and rotor bearings which accompany the disadvantage in the lubrication because adapting a common lubrication upon those bearings is accompanied by considerable difficulty.

It is an object of the present invention ot provide a structurally simple and functionally efficient lubrication means which overcomes this disadvantage and accomplishes a common lubrication for the said multiple bearings.

Another object of the invention is to provide a lubrication means for lubricating journal surfaces of individual main and rotor bearings by adapting each crankshaft seciton to feed the lubricant from a common supply source to individual surfaces to be lubricated.

Other and further objects of the invention will become apparent from the following specification and from the accompanying drawing, in which.

Figure 1:
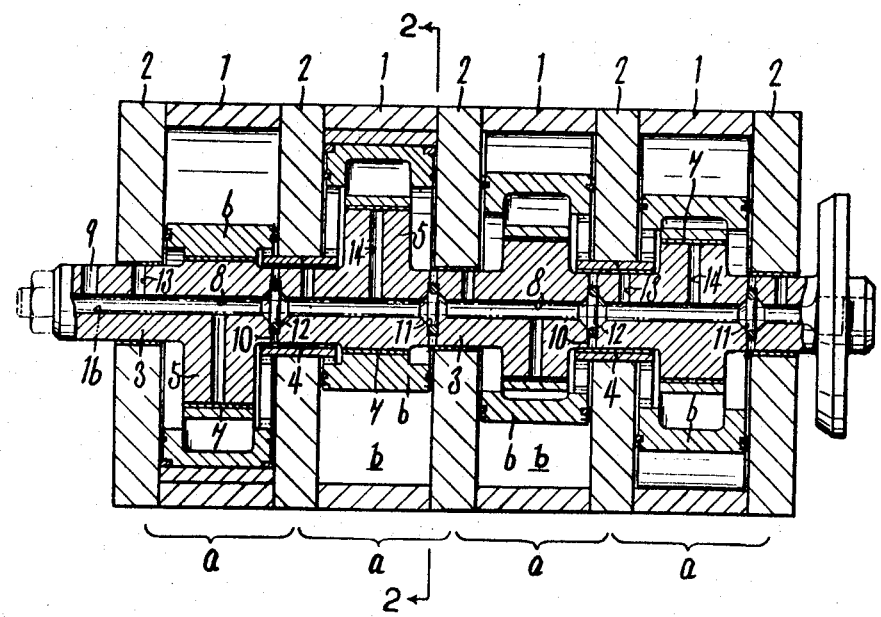
FIG. 1 is a longitudinal sectional view through a multi-stage rotary piston internal combustion engine showing the lubrication means according to the present invention.
Figure 3:
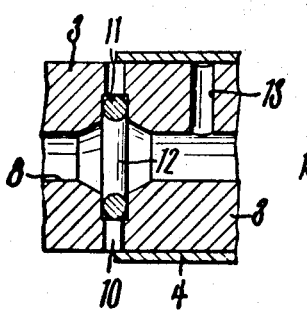
FIG. 3 is a fragmentary sectional view of a portion of FIG. 1 on an enlarged scale and showing the details of the sectional crankshaft end connection and sealing therefor.
Figure 4:
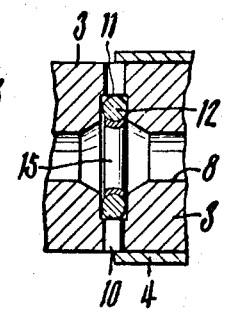
FIG. 4 is a fragmetary sectional view similar to FIG. 3 and showing a modified form of the sealing.
Figure 2:
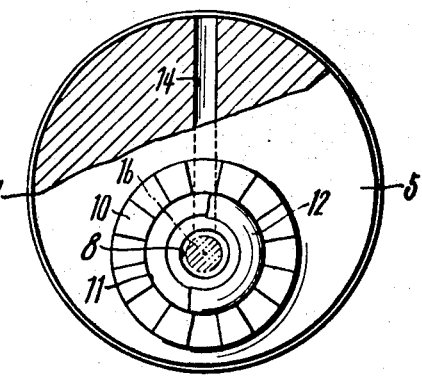
FIG. 2 is a cross-sectional view taken on the line 2—2 of FIG. 1.
Figure 5:
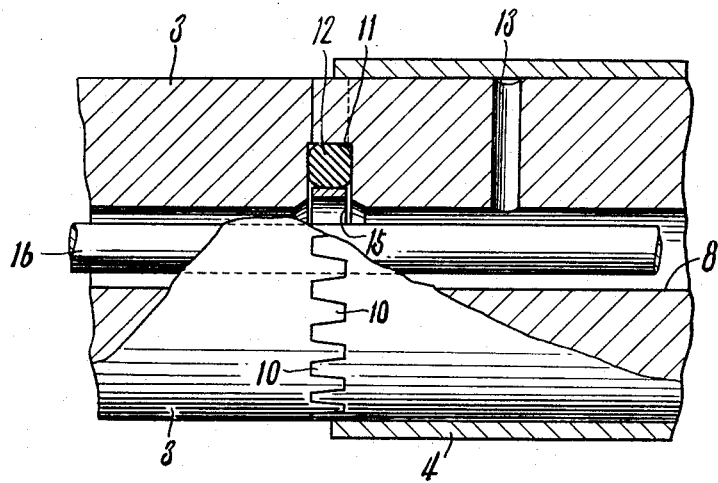
FIG. 5 is a view similar to FIG. 3, partially broken away to show the gear teeth.

Referring to the figures, each engine unit $a$ is defined by a housing composed of an annular center casing 1 having an internal trochoidal face and section walls 2 closing each lateral end of the casing 1, so that a combustion chamber $b$ is defined therein. Extending through the center of the combustion chamber $b$ is a crank shaft section 3 being in section corresponding to the individual stage of the engine and rotatably mounted in cylindrical crankshaft bushings 4 fixed in the section walls 2. Integral with the crankshaft section 3 is a crank pin 5 which is eccentrically positioned with respect to the axis of the crankshaft seciton 3. Positioned within each combustion chamber $b$ is a polygonally shaped rotor 6 and within an axial bearing aperture in the said rotor 6 the crank pin 5 is rotatably inserted in a bushing 7 fitted within the bearing aperture so that thereby effect eccentric rotation of the rotor within the chamber $b$ to perform strokes accomplishing gas suction, compression and exhaust of the products of gas combustion. Intake of the fuel gas, firing the compressed gas and exhausting the products of the combustion are performed through a conventional inlet and outlet port and an ignition plug, not shown, around the housings. Longitudinally extending through the center of the crankshaft section 3 is a center lubrication oil bore 8 connected to a common supply source, not shown, via an inlet port 9, and adapted to distribute the lubricant as hereinafter described. On the ends of each crankshaft section 3 are gear teeth 10 which are adapted to form a gear coupling when mated with the teeth on the end of another crankshaft section. Formed when the gear teeth 10 mate is a radially internally facing circular groove 11 which is larger in diameter than the center bore 8 and wider than the whole depth of the gear teeth. Inserted within the groove 11 is a sealing ring 12 adapted for sealing off the center bore 8 from gaps between mated gear teeth 10. The sealing ring 12 may be of various materials but the plastics are preferably adapted. Commonly connected to the center bore 8 and radially outwardly extending through each crankshaft 3 and crank pin 5 are branch bores 13 and 14 which respectively open to each journal surface of the main bearings and rotor bearings. Each journal will be provided with at least one branch bore, but more bores will be provided if required. Lubricant will be fed by a conventional pressure feed system from a supply source, not shown, through the center bore 8 and permitted to admit between the journal surfaces of the crankshaft 3 and bushing 4, and the crank pin 5 and bushing 7 through branch bores 13 and 14. Sealing rings 12 are in sealing engagement in the radially inwardly facing annular grooves 11. If required, annular pieces 15 will be engaged for radially outwardly supporting the said annular seals 12, as shown in FIG. 4.

The engine unit $a$ is assembled in tandem by securing the center casings and section walls each other by conventional bolting means, not shown, or a longitudinal bolt 16 throughout the center bore 8 may be adapted. Connection of each crankshaft section by mating the gear teeth 10 with the teeth on the end of another crankshaft section is effected by the said bolting securing of the engine housing elements, and if necessary, by means of the longitudinal bolt means 16 throughout the center bore 8. The crankshaft sections 3 are thereby longitudinally combined with a correct angle phase of the crank pin portion, and the sealing rings 12 will positively be held within the grooves 11, formed by mating the teeth 10, in the sealing engagement so that thereby the efficient pressure feeding of the lubricant without leakage of the pressure at the teeth connection is performed. When the annular grooves 11 are disposed concentrically with the shaft sections, the engagement of the annular seals in the grooves 11 also secures the self-concentricity of the plurality of aligned joined shaft sections. The circulation of the lubricant for the reconditioning is through the conventional means, not shown.

According to the present invention the lubrication means is considerably simplified although the various main and rotor bearing involve, and those various journals are efficiently lubricated with the common lubricator without introducing additional difficult matters.

I claim:

1. A multi-stage rotary piston-type internal combustion engine in which each stage has an annular center casing and side walls closing the center casing and defining a combustion chamber therein, a polygonally shaped rotary piston rotatably positioned within each combustion chamber, and the stages being in side-by-side abutting position; a crankshaft comprising, in combination, a plurality of aligned, joined sections, one for each stage, an eccentrically positioned crank pin on each section adapted to be rotatably positioned within the piston for the respective stage, each of the joined sections having a lubrication oil bore extending axially therethrough and each section having at least one radial branch bore connected to the said axial oil bore and radially extending through the crank pin portion for rotary piston journal lubrication, each of the joined sections having an annular recess on the end face of the section extending radially from the said axial oil bore, the recesses matching with the corresponding opposed recess on the adjacent section at the joint to define a radially inwardly facing annular groove, a plurality of crown gear teeth on the ends of each section and surrounding the said annular recess and engaged with corresponding teeth on the next adjacent section forming a coupling between the adjacent crankshaft sections, means for holding said corresponding teeth engaged, and an annular seal within each of the said annular grooves for sealing the said coupling to avoid lubrication oil leakage therethrough.

2. A crankshaft as claimed in claim 1, in which said radially inwardly facing annular grooves are concentric with the center axis of the shaft sections, the engagement of the said annular seals in the said annular grooves assuring the concentricity of the aligned, joined shaft sections.

3. A crankshaft as claimed in claim 1, in which said radially inwardly facing annular grooves are larger in axial length than the whole depth of the coupled gear teeth.

4. A crankshaft as claimed in claim 1, and further comprising an annular piece on the inside periphery of each annular seal and engaged therewith for radially outwardly supporting the said annular seal.

5. A crankshaft as claimed in claim 1, in which said means for holding said corresponding teeth engaged comprises a bolt extending through the aligned oil bores in the joined crankshaft sections and securing the sections to each other in the axial direction, said bolt having a smaller cross-sectional area than the oil bore for permitting the oil to flow between it and the wall of the oil bore.

References Cited

UNITED STATES PATENTS

| | | | |
|---|---|---|---|
| 1,984,664 | 12/1934 | Teves | 230—158 |
| 2,641,405 | 6/1953 | LeValley | 230—158 |
| 3,062,435 | 11/1962 | Bentele | 230—158 X |
| 3,279,279 | 10/1966 | Takebayashi | 123—8 X |
| 3,289,647 | 12/1966 | Turner et al. | 123—8 |

JULIUS E. WEST, *Primary Examiner.*